United States Patent
In De Betou et al.

(10) Patent No.: US 8,995,562 B2
(45) Date of Patent: Mar. 31, 2015

(54) METHOD AND APPARATUS PROVIDING PROTECTION AND DC BALANCE IN A COMMUNICATION SYSTEM

(75) Inventors: Einar In De Betou, Vällingby (SE); Peter Öhlén, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 201 days.

(21) Appl. No.: 13/578,672

(22) PCT Filed: Feb. 14, 2011

(86) PCT No.: PCT/SE2011/050156
§ 371 (c)(1),
(2), (4) Date: Aug. 13, 2012

(87) PCT Pub. No.: WO2011/099930
PCT Pub. Date: Aug. 18, 2011

(65) Prior Publication Data
US 2012/0314799 A1    Dec. 13, 2012

Related U.S. Application Data

(60) Provisional application No. 61/304,622, filed on Feb. 15, 2010.

(51) Int. Cl.
*H04L 27/00* (2006.01)
*H04L 25/49* (2006.01)
*H04L 25/03* (2006.01)

(52) U.S. Cl.
CPC ...... *H04L 25/4908* (2013.01); *H04L 25/03866* (2013.01)
USPC .......................................... 375/295

(58) Field of Classification Search
CPC ..... H04L 1/00; H04L 25/49; H04L 25/03866; H04L 25/4908; H04L 29/06
USPC .................. 375/242, 267, 292, 295, 371, 377
See application file for complete search history.

(56) References Cited

U.S. PATENT DOCUMENTS

| | | | |
|---|---|---|---|
| 5,825,824 A * | 10/1998 | Lee et al. | 375/292 |
| 6,351,501 B1 * | 2/2002 | Murdock | 375/292 |
| 2005/0025195 A1 * | 2/2005 | Barrett et al. | 370/532 |
| 2009/0010362 A1 | 1/2009 | Thaler | |
| 2012/0163490 A1 * | 6/2012 | Whitby-Strevens | 375/285 |

FOREIGN PATENT DOCUMENTS

| | | |
|---|---|---|
| WO | 02080479 A1 | 10/2002 |
| WO | WO 02/080479 A1 | 10/2002 |

* cited by examiner

*Primary Examiner* — Syed Haider

(57) ABSTRACT

A method and apparatus for controlling DC balance in a digital communication system in which data frames are transmitted, wherein the data frames include a header portion that is transmitted unscrambled and a payload portion that is scrambled before transmission. The header portion includes a frame counter field. A value for the frame counter field is randomly generated and an effect on the DC balance is estimated. It is then determined whether the estimated effect on the DC balance meets defined requirements for DC balance. When the estimated effect does not meet the defined requirements for DC balance, a new random value for the frame counter field is generated and checked. When the estimated effect meets the requirements, the randomly generated value is utilized in the frame counter field in transmitted data frames.

8 Claims, 5 Drawing Sheets

METHOD AND APPARATUS PROVIDING PROTECTION AND DC BALANCE IN A COMMUNICATION SYSTEM

This application claims the benefit of U.S Provisional Application No. 61/304,622 filed Feb. 15, 2010, the disclosure of which is fully incorporated herein by reference.

TECHNICAL FIELD

The present invention relates generally to communication systems, and more particularly, to a method and apparatus for providing improved scrambling, protection, and DC balance in a communication system.

BACKGROUND

Some communication systems are digital systems in which binary data is transmitted over a medium using a time division multiplex (TDM) protocol. Such systems may encode the binary data as non-return-to-zero (NRZ) and may not utilize any line coding. The transmission medium may be optical fibers but may also be copper or any other type of physical media.

To ensure that low enough signal content is contained in the lower part of the frequency spectrum, either line coding or scrambling may be employed. This potentially improves the Direct Current (DC) balance of the signal and potentially reduces the risk of having long runs of Contiguous Identical Digits (CID). Some systems scramble the signal while some parts of the signal must be left unscrambled.

One example of such a system is a Passive Optical Network (PON) fiber access system. A PON is a communication system where data is transmitted bi-directionally over a fiber infrastructure, the Optical Distribution Network (ODN), in a point-to-multi-point configuration. The ODN includes an Optical Line Termination (OLT), which resides in a Central Office (CO). The OLT services a number of Optical Network Units (ONUs) or Optical Network Terminations (ONTs) residing at, or close to, the premises of the end users, typically connected in a star arrangement using optical power splitters. Since the physical medium is shared, the ONUs are scheduled by the OLT to transmit in the upstream direction in a Time Division Multiple Access (TDMA) manner.

More specifically, the 10 Gbit/s capable PON system, which is standardized by the ITU-T and referred to as XG-PON, exemplifies such a system.

In the types of systems outlined above, it is often desirable to ensure that low enough signal content is located in the lower part of the frequency spectrum. There are several reasons for this including, but not limited to:

The low frequency part of the signal may be blocked. This is commonly referred to as "AC-coupling" or "DC block", but several other names exist as well. There are several reasons why a system may be AC-coupled, both intentional and unintentional. One example of an intentional reason is to allow for a receiver design where the received signal is compared against its average value over time. In this way, it can be detected whether the transmitted signal was a binary "one" or a binary "zero".

Clock and Data Recovery (CDR) works best when there is high enough transition density in the signal.

The DC balance (or DC component) of a signal is the shill of the transmitted center level. The shill is created by the ratio of the average time the signal is on compared to the time the signal is off. Any drift of the transmitted signal from the center baseline level will create a DC imbalance, which degrades the performance of the communication. This performance degradation can be quantified, for example, in terms of Bit Error Rate (BER) penalty or sensitivity penalty at the receiver.

Scrambling works by the principle of randomizing data. Calculated over time, a random data signal has good DC balance and a low probability of long runs of CID. In practice, this reduces the risk of a large amount of the signal content residing in the low frequency region of the spectrum. Scrambling works by calculating the bit-wise XOR of the input data stream with a scrambling sequence. The result of this operation, the scrambler output, is transmitted over the physical link. At the receiver, the same procedure is repeated, often referred to as descrambling. In the case of error-free transmission over the physical link, the output of the descrambling is identical to the data that was input to the scrambler.

If the data input to the scrambler is exactly synchronized to the scrambler sequence, only zeros are generated at the output. Thus, a long run of CID would be generated, which would negatively affect the DC balance of the signal. This could potentially lead to bit errors and loss of synchronization in the receiver. Additionally, it would allow a malicious user to transmit data that contains the scrambler sequence to purposely disrupt the system.

Examples of systems that utilize scrambling are GPON (ITU-T recommendation G.984 series) and the next generation 10 Gbit/s capable PON system, which is currently being standardized by the ITU-T (ITU-T Recommendation G.987 series) and herein referred to as XG-PON. In these systems, transmission is frame-based. All contents of the frame, apart from an initial part, are scrambled with a frame-synchronous scrambler (i.e., the scrambler is preset to a deterministic state at the start of each frame). Each frame contains a frame counter which increments by one for every frame. This provides timing information to devices that are connected to these systems.

One method of preventing the data input to the scrambler from being exactly synchronized to the scrambler sequence is to use a long scrambler sequence. As an example, in the XG-PON systems, the signal is scrambled with a frame-synchronous scrambler, which is generated by a 58-bit shift register operating at the line rate. If the user data contains a part of the scrambler sequence, the use of a long scrambler sequence prevents the user data from being exactly synchronized to the scrambler sequence.

Since the XG-PON frames are much shorter than the scrambler sequence, the frame counter located in the first part of the frame is used to provide an initial seed to the scrambler in each frame transmission. The seed is used to set the scrambler shift register to an initial value, By using the frame counter as a seed to the scrambler, the entire scrambler sequence is utilized. At system startup, the OLT initializes the frame counter to a specific start value.

FIG. 1 is an illustration of an existing XG-PON frame 11. The frame consists of a 24-byte frame header 12 and a frame payload 13. The frame header contains a physical layer synchronization field (PSYNC) 14 and may also contain a PON-ID field 15 and a frame counter field 16. The PON-ID field identifies the PON system, and in some systems is part of the unscrambled portion of the frame. The frame counter field, which increments by one for every frame, provides timing information to devices that are connected to these systems. It is also used as a seed (or sometimes referred to as a pre-load value) to the descrambler in the receiver. For every received frame, the receiver uses the seed to initialize the descrambler. The frame header may also contain parity bits (not shown) that provide error indications or error correction capabilities.

There may also be other data fields within the frame header. The exact contents and position of the fields within the frame header is not yet standardized.

FIG. 2 is a simplified block diagram of an example of an existing frame-synchronous scrambler 17. The scrambler includes a 58-bit shift register 18 operating at the line rate. The scrambler scrambles all contents of the frame, apart from the initial header fields.

SUMMARY

The types of systems outlined above have a number of disadvantages. First, since the frame counter value controls which scrambling sequence will be used to scramble a certain frame, the systems are vulnerable to malicious users. If a malicious user can predict the current and future values of the frame counter, that user may be able to predict which data patterns to use to disrupt the system. It would therefore be desirable for the frame counter value to be difficult to predict. Second, since the receiver uses the value of the frame counter to descramble the frame, at least the frame counter needs to be transmitted over the physical link unscrambled. Other information contained in the frame might also have to be left unscrambled when transmitted over the physical link. These fields in the frame could potentially have a poor DC balance, which could lead to performance degradation in the communication over the link. Therefore it is desirable for these fields in the frame to have a good DC balance.

The present improves the DC balance and CID characteristics of the unscrambled part of the frame so that any performance degradation in the communication over the physical link relating to poor DC balance and CID is minimized. The invention also makes the frame counter value less predictable, which makes it more difficult for a malicious user to disrupt the system.

In one embodiment, the present invention is directed to a method of controlling DC balance in a digital communication system in which data frames are transmitted, the data frames having a header portion that is transmitted unscrambled and a payload portion that is scrambled before transmission, the header portion including a frame counter field. The method includes the steps of randomly generating a value for the frame counter field; estimating an effect of the randomly generated value on the DC balance; and determining whether the estimated effect of the randomly generated value on the DC balance meets defined requirements for DC balance. When the estimated effect of the randomly generated value on the DC balance does not meet the defined requirements for DC balance, the method repeats the randomly generating, estimating, and determining steps until the estimated effect of the randomly generated value on the DC balance meets the defined requirements for DC balance. When the estimated effect of the randomly generated value on the DC balance meets the defined requirements for DC balance, the method utilizes the randomly generated value in the frame counter field in transmitted data frames.

In another embodiment, the present invention is directed to an apparatus for controlling DC balance in a digital communication system in which data frames are transmitted, the data frames having a header portion that is transmitted unscrambled and a payload portion that is scrambled before transmission, the header portion including a frame counter field. The apparatus includes a random number generator for randomly generating a value for the frame counter field; a DC balance estimation unit for estimating an effect of the randomly generated value on the DC balance; and a comparator for determining whether the estimated effect of the randomly generated value on the DC balance meets defined requirements for DC balance. When the estimated effect of the randomly generated value on the DC balance does not meet the defined requirements for DC balance, the comparator is adapted to instruct the random number generator to randomly generating additional values for the frame counter field until the estimated effect of the randomly generated value on the DC balance meets the defined requirements for DC balance. When the effect of the randomly generated value on the DC balance meets the defined requirements for DC balance, the comparator is adapted to utilize the randomly generated value in the frame counter field in transmitted data frames.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

It is noted at the outset that the terms "coupled," "connected", "connecting," "electrically connected," etc., are used interchangeably herein to generally refer to the condition of being electrically connected. Similarly, a first entity is considered to be in "communication" with a second entity (or entities) when the first entity electrically sends and/or receives (whether through wireline or wireless means) information signals (whether containing voice information or non-voice data information) to the second entity regardless of the type (analog or digital) of those signals. It is further noted that various figures (including component diagrams) shown and discussed herein are for illustrative purpose only, and are not drawn to scale.

Additionally, it should be understood that the invention may be implemented in hardware or in a combination of hardware and software. For example, one or more computers or processors may perform the steps of the method of the present invention when executing computer program instructions stored in one or more program memories.

Figure 3:
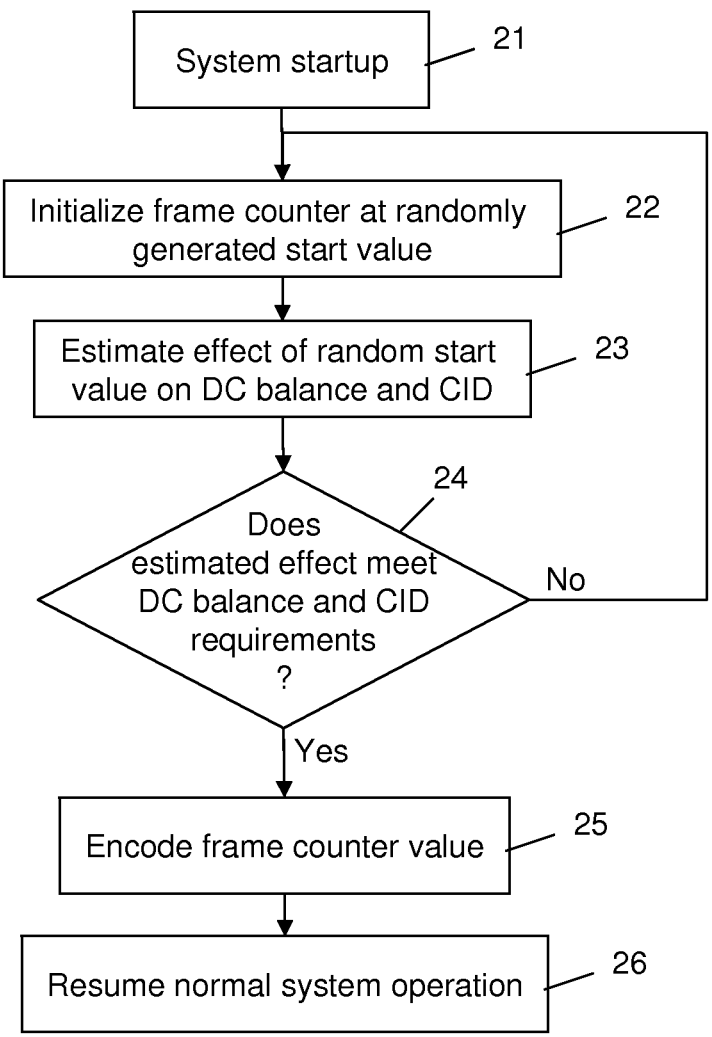
FIG. 3 is a flow chart illustrating the steps of an exemplary embodiment of the method of the present invention.

FIG. 3 is a flow chart illustrating the steps of an exemplary embodiment of the method of the present invention. At step 21, the system is started up. At step 22, instead of starting the frame counter at a fixed start value (thereby making subsequent frame counts predictable), the frame counter is initialized at a randomly generated start value. This step alone provides increased security against malicious users trying to predict the current and future values of the frame counter, and thereby predict which data patterns to use to disrupt the system. At step 23, the effect that the random value has on the DC balance and CID is estimated and then checked against predefined requirements for DC balance and CID. At step 24, if the estimated effect of the random value does not meet the DC balance and CID requirements, the method returns to step 22 where a new random value is generated and then rechecked. If the estimated effect of the random value meets the DC balance and CID requirements, the method moves instead to step 25 where the frame counter value is encoded so that its characteristics in terms of DC balance and CID are improved. At step 26, normal system operation is resumed.

The invention recognizes that the most significant bits of the frame counter will change less frequently than the least significant bits. Therefore, in one embodiment, the DC balance and CID requirements may be defined so that the DC balance and CID of the most significant bits are valued higher than the least significant bits.

The invention also recognizes that the most significant bits of the frame counter may not change over the entire system lifetime. Therefore, in another embodiment, these bits may be chosen so they contain a pattern that is fixed for the lifetime of the system, the pattern having good characteristics in terms of DC balance and CID. The initial definition of the fixed pattern may be randomly generated.

Figure 1:
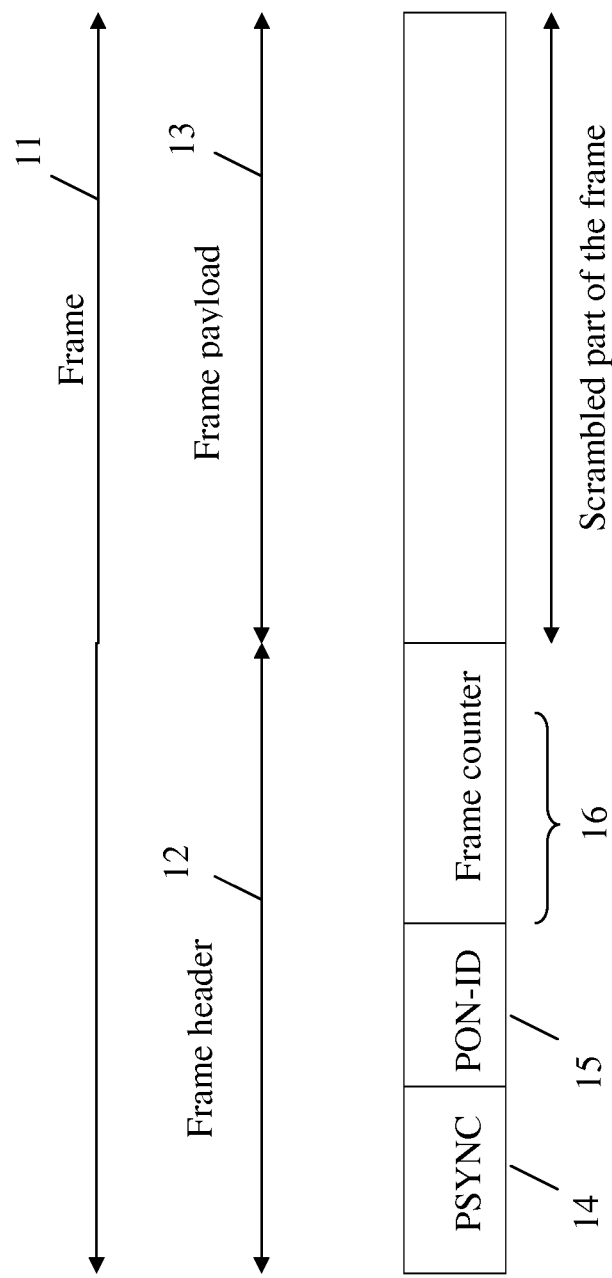
FIG. 1 is an illustration of an existing XG-PON frame.
Figure 4:
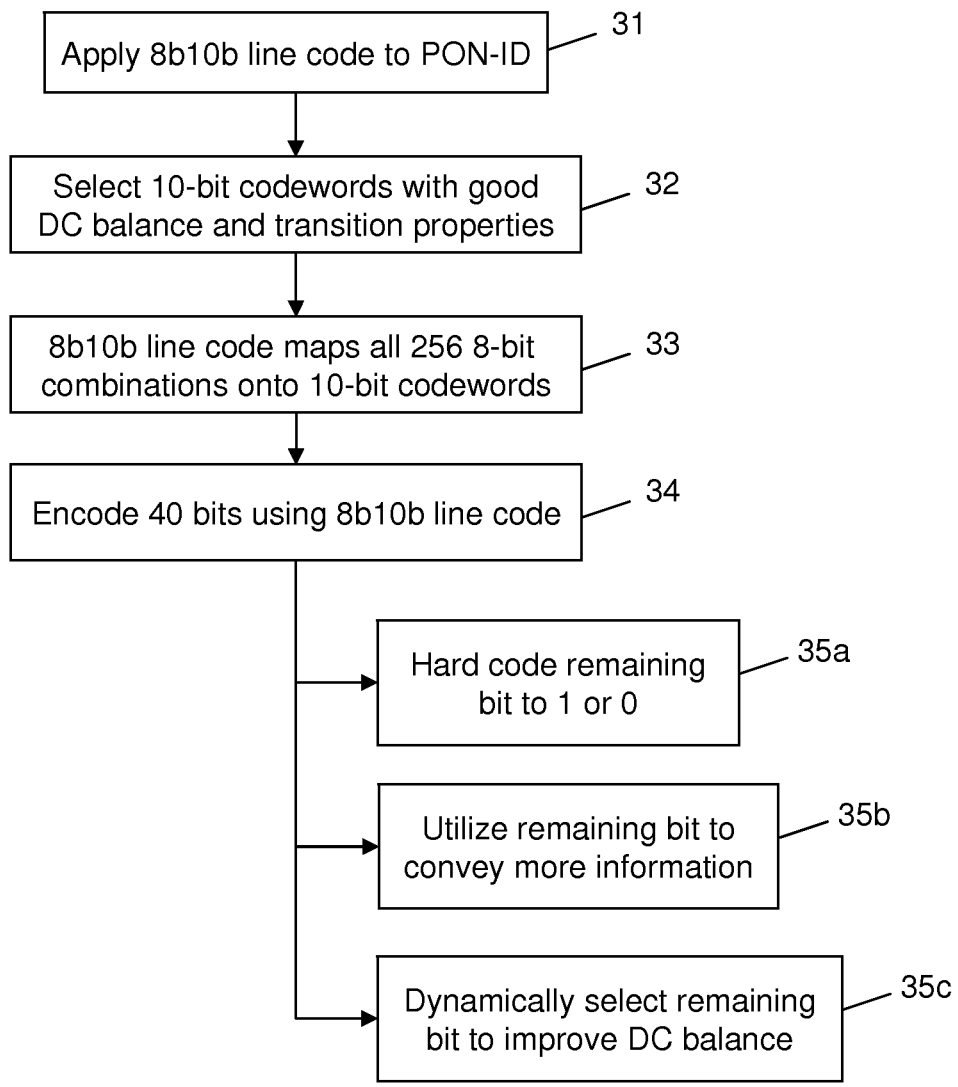
FIG. 4 is a flow chart illustrating the steps of another exemplary embodiment of the method of the present invention.

FIG. 4 is a flow chart illustrating the steps of another exemplary embodiment of the method of the present invention. As described above in relation to FIG. 1, some implementations have the PON-ID as part of the unscrambled portion of the frame. This may also lead to undesired DC imbalance and a low number of transitions, which may degrade the transmission. The present invention also provides a method to avoid a large imbalance in the number of ones and zeros in the PON-ID. At step 31, an 8b10b line code is applied to the PON-ID. At step 32, a number of 10-bit codewords are selected from the 1024 possible 10-bit combinations to contain a set of codewords with good DC-balance and transition properties. At step 33, the 8b10b line code maps all 256 possible 8-bit combinations of the PON-ID field onto the 10-bit codewords selected to improve the DC balance. This reduces the number of unique PON-IDs to 40 or 41 bits. At step 34, forty bits are encoded using the Bbl Ob line code, resulting in 50 transmitted bits with much better DC balance. Several options exist for utilizing the remaining bit. At step 35a, the remaining bit is hard-coded to "1" or "0". At step 35b, the remaining bit is used to convey one more bit of information, resulting in 41 effective bits for the PON-ID. At step 35e, the remaining bit is selected dynamically to further improve the DC balance.

The methods described above may also be applied fully or partially to other unscrambled fields in the frame to provide good DC balance and CID characteristics.

Figure 5:
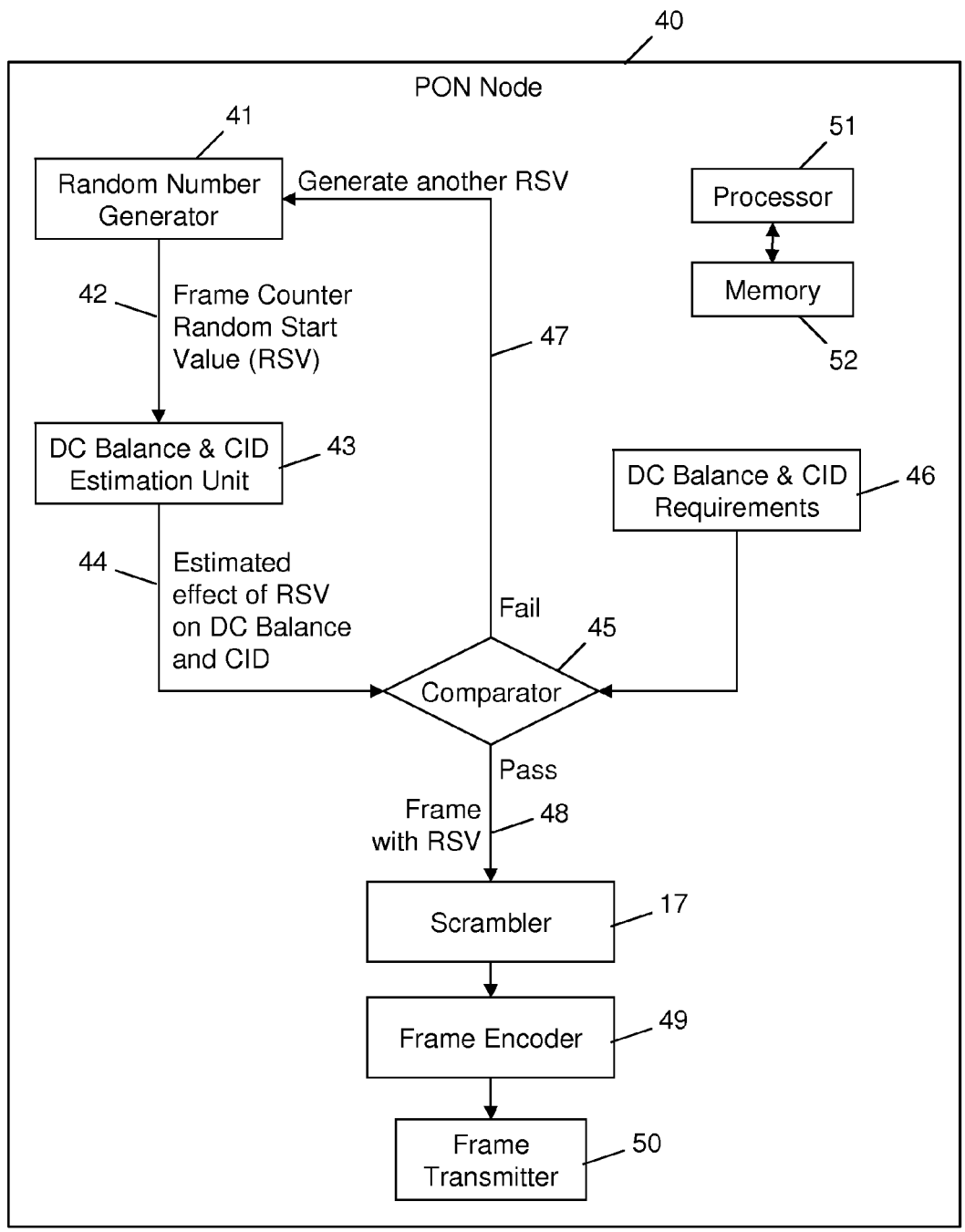
FIG. 5 is a simplified block diagram of an exemplary embodiment of the apparatus of the present invention as implemented in a Passive Optical Network (PON) node.

FIG. 5 is a simplified block diagram of an exemplary embodiment of the apparatus of the present invention as implemented in a PON node 40, A random number generator 41 generates a frame counter random start value (RSV) 42 and provides it to a DC balance and CID estimation unit 43. The estimation unit estimates the effect 44 that the RSV would have on the DC balance and CID. The estimated effect is input to a comparator 45, which also receives predefined DC balance and CID requirements 46 for comparison. If the comparator determines that the estimated effect does not meet the DC balance and CID requirements, a failure is determined, and the comparator sends an instruction 47 to the random number generator 41 to generate another frame counter RSV.

Figure 2:
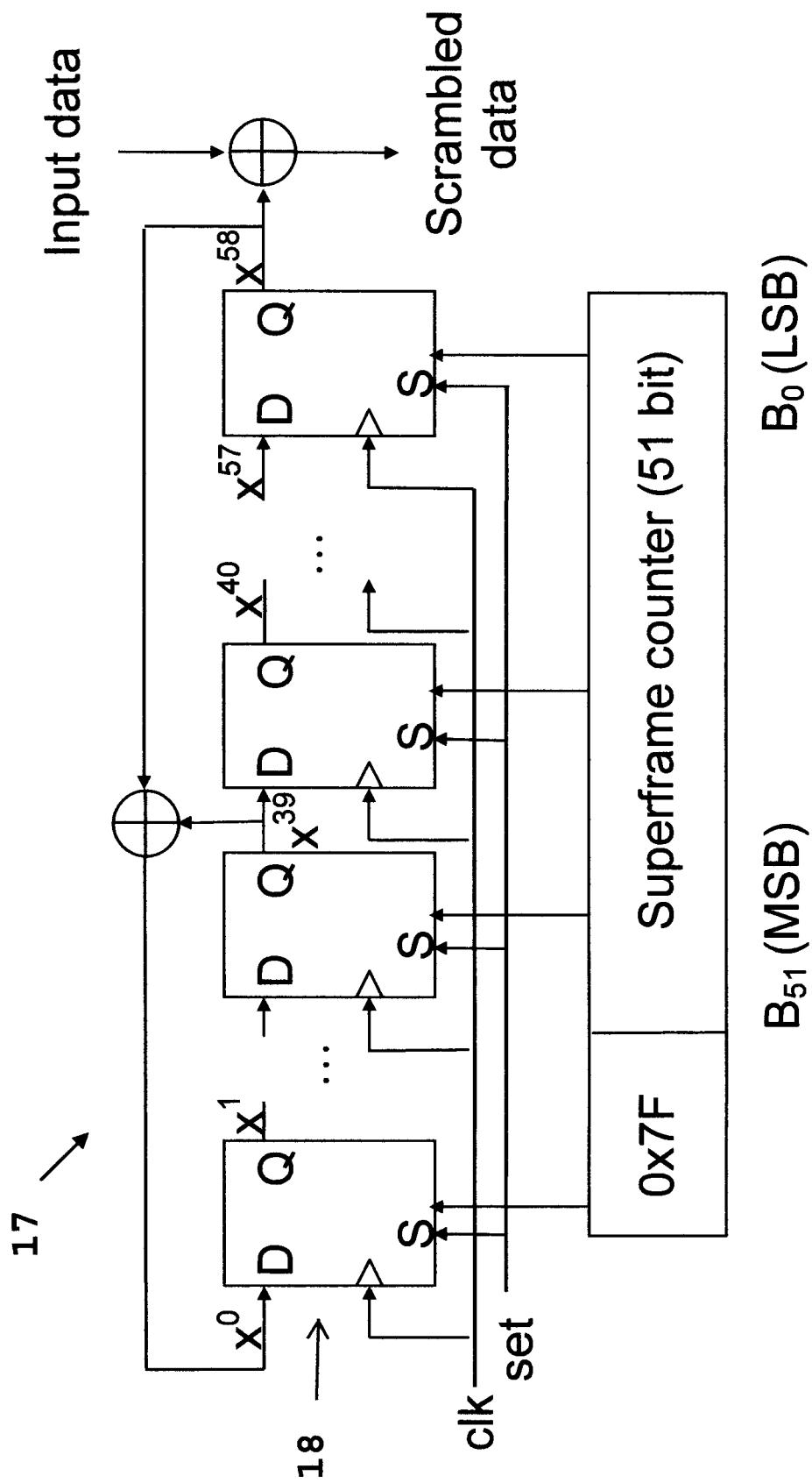
FIG. 2 is a simplified block diagram of an example of an existing frame-synchronous scrambler.

The apparatus continues this process until the comparator 45 determines that the estimated effect that the RSV would have on the DC balance and CID meets the DC balance and CID requirements. The frame 48 with the successful RSV is then provided to a scrambler 17, which may be similar to the scrambler illustrated in FIG. 2. A frame encoder 49 then encodes the frame and provides it to a frame transmitter 50 for transmission through the PON network.

The apparatus may be implemented in hardware or in a combination of hardware and software. For example, one or more computers or processors 51 may perform the steps of the method of the present invention when executing computer program instructions stored in one or more program memories 52.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of controlling direct current, DC, balance in a digital communication system in which data frames are transmitted, the data frames having a header portion that is transmitted unscrambled and a payload portion that is scrambled before transmission, the header portion including a frame counter field, the method comprising the steps of:
   a) randomly generating, by a random number generator, a value for the frame counter field;
   b) estimating an effect of the randomly generated value on the DC balance of a frame;
   c) determining whether the estimated effect of the randomly generated value on the DC balance of the frame meets defined requirements for DC balance;
   d) when the estimated effect of the randomly generated value on the DC balance of the frame does not meet the defined requirements for DC balance, repeating steps a) through c) until the estimated effect of the randomly generated value on the DC balance of the frame meets the defined requirements for DC balance; and
   e) when the estimated effect of the randomly generated value on the DC balance of the frame meets the defined requirements for DC balance, utilizing the randomly generated value in the frame counter field in the transmitted data frames.

2. The method according to claim 1, wherein in addition to the DC balance, the method also considers the estimated effect of the randomly generated value on the number of Contiguous Identical Digits, CID, when determining whether to utilize the randomly generated value in the frame counter field in the transmitted data frames.

3. A method of controlling direct current, DC, balance in a digital communication system in which data frames are transmitted, the data frames having a header portion that is transmitted unscrambled and a payload portion that is scrambled before transmission, the header portion including a frame counter field, the method comprising the steps of:
   a) randomly generating, by a random number generator, a value for the frame counter field;
   b) estimating an effect of the randomly generated value on the DC balance of a frame;
   c) determining whether the estimated effect of the randomly generated value on the DC balance of the frame meets defined requirements for DC balance;
   d) when the estimated effect of the randomly generated value on the DC balance of the frame does not meet the defined requirements for DC balance, repeating steps a) through c) until the estimated effect of the randomly generated value on the DC balance of the frame meets the defined requirements for DC balance; and e) when the estimated effect of the randomly generated value on the DC balance of the frame meets the defined requirements for DC balance, utilizing the randomly generated value in the frame counter field in the transmitted data frames;

wherein the header portion also includes a network identifier field, and the method further comprises the steps of:

applying an 8b10b line code to the network identifier field;

selecting a number of 10-bit codewords for which DC balance and transition properties meet defined requirements;

utilizing the 8b10b line code to map all 256 8-bit combinations of the network identifier field onto the selected 10-bit codewords, thereby reducing the number of unique network identifiers to 40 or 41 bits; and encoding the 40 bits utilizing the 8b10b line code.

4. The method according to claim 3, further comprising hard coding a remaining bit to 1 or 0.

5. The method according to claim 3, further comprising utilizing a remaining bit to convey additional information in the data frames.

6. The method according to claim 3, further comprising dynamically selecting a remaining bit to further improve the DC balance of the frames.

7. An apparatus for controlling direct current, DC, balance in a digital communication system in which data frames are transmitted, the data frames having a header portion that is transmitted unscrambled and a payload portion that is scrambled before transmission, the header portion including a frame counter field, the apparatus comprising:

a random number generator for randomly generating a value for the frame counter field;

a DC balance estimation unit for estimating an effect of the randomly generated value on the DC balance of a frame;

a comparator for determining whether the estimated effect of the randomly generated value on the DC balance of the frame meets defined requirements for DC balance, wherein:

when the estimated effect of the randomly generated value on the DC balance of the frame does not meet the defined requirements for DC balance, the comparator is configured to instruct the random number generator to randomly generating additional values for the frame counter field until the estimated effect of the randomly generated value on the DC balance of the frame meets the defined requirements for DC balance; and when the effect of the randomly generated value on the DC balance of the frame meets the defined requirements for DC balance, the comparator is configured to utilize the randomly generated value in the frame counter field in the transmitted data frames.

8. The apparatus according to claim 7, wherein in addition to the DC balance, the apparatus is also configured to consider the effect of the randomly generated value on the number of Contiguous Identical Digits, CID, when determining whether to utilize the randomly generated value in the frame counter field in the transmitted data frames.

* * * * *